United States Patent [19]

Zimmerman et al.

[11] Patent Number: 4,845,583

[45] Date of Patent: Jul. 4, 1989

[54] RECORD DISKETTE OR DISK JACKETS LINED WITH POWDER BONDED NONWOVEN FABRICS

[75] Inventors: Nancy J. Zimmerman, Clemson; David L. Burge, Greenville, both of S.C.

[73] Assignee: Bonar Fabrics Corporation, Greenville, S.C.

[21] Appl. No.: 46,779

[22] Filed: May 7, 1987

[51] Int. Cl.[4] .................. G11B 23/033; B65D 85/30
[52] U.S. Cl. ...................................... 360/133; 206/444
[58] Field of Search ............... 360/133; 206/444, 313; 428/900

[56] References Cited

U.S. PATENT DOCUMENTS

| | | | |
|---|---|---|---|
| 2,880,112 | 3/1959 | Drelich | 428/195 |
| 2,880,113 | 3/1959 | Drelich | 428/195 |
| 3,668,658 | 6/1972 | Flores et al. | 360/133 |
| 3,864,755 | 2/1975 | Hargis | 360/133 |
| 3,931,644 | 1/1978 | Ward | 360/133 |
| 3,947,893 | 3/1976 | Hall | 360/133 |
| 4,106,067 | 8/1978 | Masuyama et al. | 360/133 |
| 4,251,843 | 2/1981 | Masuyama et al. | 360/133 |
| 4,297,410 | 10/1981 | Tsuchiya et al. | 428/283 |
| 4,354,213 | 10/1982 | Martinelli | 360/133 |
| 4,586,606 | 5/1986 | Howey | 360/133 |
| 4,610,352 | 9/1986 | Howey et al. | 360/133 |
| 4,655,348 | 4/1987 | Takagi | 360/133 |
| 4,680,661 | 7/1987 | Oishi | 360/133 |
| 4,709,816 | 12/1987 | Matsumoto et al. | 360/133 |
| 4,724,501 | 2/1988 | Buchwald et al. | 360/133 |

OTHER PUBLICATIONS

Petkiewicz, "Nonwovens as Liners for Floppy Disks", *Nonwovens World*, May–Jun., 1986, pp. 120–124.

*Primary Examiner*—John H. Wolff
*Assistant Examiner*—Matthew J. Bussan
*Attorney, Agent, or Firm*—Lyon & Lyon

[57] ABSTRACT

The use of powder bonded nonwoven fabrics as liners for jackets for retaining "floppy" diskettes or disks results in significant increases in production throughput rates for the blanks used to make such jackets, and to improvements in lamination and fiber retention around the cutouts in these blanks.

28 Claims, 5 Drawing Sheets

RECORD DISKETTE OR DISK JACKETS LINED WITH POWDER BONDED NONWOVEN FABRICS

FIELD OF THE INVENTION

This invention relates to diskette or disk jackets or cartridges and processes for their preparation. More particularly, this invention relates to casettes, jackets or cartridges for retaining flexible rotary magnetic record diskettes or disks, also known as "floppy" diskettes or disks, in which a nonwoven fabric, including fabrics made using an antistatic fiber as all or a substantial part of their fiber content or using an antistatic finish on all or a substantial part of the fiber content or on all or a substantial part of the fabric itself, is employed as the liner which comes in direct contact with the record diskette or disk.

BACKGROUND OF THE INVENTION

Floppy diskettes or disks onto which information has been entered for later access or retrieval by a computer's magnetic transducer are customarily used and stored in diskette or disk jackets or cartridges. Such jackets are usually lined with porous, low-friction materials, preferably ones having antistatic properties, which protect the magnetic recording surface of the diskette or disk from damage and contamination from dust and other particulate matter during storage, handling and use. Such liners also clean contaminants that may be present from the magnetic recording surface of the diskette or disk while its stored information is being accessed by the computer.

Nonwoven fabrics whose fiber content has been bonded by heat to fuse individual fibers together at their crossover points, and nonwovens bonded by applying a liquid adhesive substance, e.g., a natural or synthetic polymer latex or emulsion, to a fibrous mat or web, including such nonwovens onto or into which an antistatic agent has also been incorporated, have been disclosed as being useful as diskette or disk jacket or cartridge liners.

Included among prior art disclosures of diskette or disk jacket or cartridge liners are those found in the following sources:

U.S. Pat. No. 3,668,658, issued June 6, 1972 to Flores et al, discloses diskette jackets or cartridges having inner layers which comprise "a porous, low-friction, antistatic material" which is not, however, a pre-formed nonwoven fabric; see, e.g., from column 2, line 72 to column 3, line 17.

U.S. Pat. No. 3,931,644, issued Jan. 6, 1976 to Ward, discloses a diskette or disk jacket or cartridge lined with "disk-engaging liners . . . of suitable, static-free material"; column 3, lines 30-36.

U.S. Pat. No. 3,931,644, issued Jan. 6, 1976 to Ward, discloses a particular construction for a diskette jacket or cartridge liner which incorporates "wiper layers made of a non-woven synthetic fiber [which] . . . provide low friction, antistatic surfaces"; see, e.g., column 2, lines 2-5. The wiper layers are disclosed as being "made of a porous, low-friction, anti-static material"; see column 2, lines 63 and 64, which is "a synthetic and non-woven fibrous material", column 3, lines 36-44.

U.S. Pat. Nos. 4,586,606 and 4,610,352, issued May 6 and Sept. 9, 1986 Howey and Howey et al, respectively, disclose particular thermally bonded nonwoven fabric constructions used as diskette jacket or cartridge liners; see, e.g., column 1, lines 5-9 and 25-43; column 2, lines 55-65; column 5, lines 6-9 and column 7, lines 7-24 of the '606 patent.

U.S. Pat. No. 4,251,843, issued Feb. 17, 1981 to Masuyama et al, discloses an improvement in:

"(t)he conventional disc jacket . . . provided on the inner surface thereof with a fibrous layer made of nonwoven cloth or the like for protecting and cleaning the surface of the disc", column 1, lines 31-34, the nonwoven cloth being one:

" . . . made [of] fibrous materials such as nylon (polyamide), polyesters, viscose rayon, cellulose acetate, polypropylene, acrylic resins, alkyl acrylate copolymers and so forth mixed with a binder to form [a] nonwoven cloth. The nonwoven materials are fabric-like products which are made by arranging fibers (the above-[described] fibrous materials), in a web or mat form by a conventional method and then bonding the fibers to each other using an adhesive such as a natural latex, e.g., a latex of natural rubber, a synthetic latex or such in combination with urea resins or melamine [resin adhesives], or by utilizing the adhesive force of the fibers themselves, e.g., when using polyethylenes, polypropylene or polyamides. Of the synthetic [latices], acrylonitrile-butadiene copolymers and acrylonitrile are preferred, with synthetic [latices] of a molecular weight of about 800 to about 10,000 being most preferred", column 1, line 60–column 3, lines 8.

The '843 patent's disclosed improvement comprises including an anionic, cationic or nonionic antistatic agent in the nonwoven cloth to prevent it from becoming electrostatically charged; see, e.g., column 4, lines 21-30 and column 6, lines 42-50 of the '843 patent.

A diskette cartridge or envelope " . . . fabricated by bonding together a layer of porous fibrous, low-friction, anti-static material and a layer of solid material" is disclosed in U.S. Pat. No. 4,354,213, issued Oct. 12, 1982 to Martinelli; see column 1, lines 17-19. According to the '213 patent:

"Currently the porous fibrous, low-friction, antistatic liner material is fabricated by bonding together a loose mass of synthetic fibers. Within the category of materials fabricated in the foregoing manner, there are two materials made from different compositions of fibers and formed into a whole mass in different ways, currently in wide use as floppy disk liner materials. The first kind includes a mixture of 70% to 80% rayon fibers with 30% to 20% polypropylene fibers. The polypropylene fibers have a lower softening temperature than the rayon fibers. Thus, a loose mixture of these fibers is normally bound into a cohesive layer by heating such a mass of fibers to the temperature at which the polypropylene fibers soften and adhere to each other and also the rayon fibers and then cooling the resultant material. The second type of material used for floppy disk liners includes almost entirely polyester fibers. This type of fiber is formed into a cohesive layer by applying a liquid binder solution containing, in addition to other substances, polyester molecules and a catalyst, to a mass of loose fibers. This coated mass of fibers is then further processed to polymerize certain components in the binder solution yielding a cohesive layer of bound fibers comprising approximately 93% polyester fibers and 7% polyester terpolymer binder. The polyester terpolymer binder is formed by the polymerization of the polyester molecules contained in the binder solution applied to the loose fiber mass", column 1, lines 24-51.

An overview of this technological area is given in Petkiewicz, 'Nonwovens as Liners for Floppy Disks', *Nonwovens World*, May-June, 1986, pp. 120-124. The nonwoven fabric types identified by Petkiewicz as being used as floppy disk jacket liners are "thermally bonded rayon/polypropylene", "chemically bonded rayon/polyester (acrylic)", "chemically bonded rayon (SBR)" and "thermally bonded polyester"; Table 2, p. 123.

It is an object of this invention to provide novel diskette or disk jackets or cartridges and processes for their preparation.

Another object of this invention is to provide novel diskette or disk jackets or cartridges lined with particular nonwoven fabrics.

A further object of this invention is to provide an improved method of preparing diskette or disk jackets or cartridges lined with particular nonwoven fibers which achieves significant increases in production through-put rates for the blanks used to prepare diskette or disk jackets or cartridges as well as improvements in the lamination of the liner to the outer jacket material around cutouts in such jackets or cartridges.

These and other objects, as well as the nature, scope and utilization of this invention, will become readily apparent to those skilled in the art from the following description, the drawings and the appended claims.

SUMMARY OF THE INVENTION

It has now been discovered, quite unexpectedly, that by using a powder bonded nonwoven fabric, preferably although not necessarily one made using an antistatic fiber as all or a substantial part of its fiber content, or using an antistatic finish on all or a substantial part of the fiber content of the powder bonded nonwoven fabric or on all or a substantial part of the fabric itself, as the liner in otherwise conventional diskette or disk jackets or cartridges prepared in otherwise conventional fashion, significant increases can be achieved in production through-put rates for the blanks used to prepare diskette or disk jackets or cartridges as compared to the rates achieved when conventionally-employed nonwoven fabrics, e.g., thermally-bonded nonwovens, are used as the diskette or disk jacket or cartridge liner.

It has also been discovered, again quite unexpectedly, that even greater increases in production through-put rates for the blanks used to prepare diskette or disk jackets or cartridges can be achieved when the powder bonded nonwoven fabric used as the diskette or disk jacket or cartridge liner is one made using an antistatic fiber as all or a substantial part of the powder bonded nonwoven fabric's fiber content, or when an antistatic finish is used on all or a substantial part of the fiber content of the powder bonded nonwoven fabric or on all or a substantial part of the fabric itself.

When using powder bonded nonwoven fabrics—antistatic fiber or fabric-containing or not—as diskette or disk jacket or cartridge liners, improvements in lamination around cutouts in the diskette or disk jackets or cartridges, and in cleanliness (lessened protrusion of fibers into the cutout areas) are also achieved.

DETAILED DESCRIPTION OF THE INVENTION

The nonwoven fabric used in practicing this invention is produced by carding the fibers being used, then forming, preferably by dry-laying on a conveyer, a layer of the carded fibers, and then applying a powdered bonding material to the resultant layered web and distributing the bonding material through the web. The fibrous web is subsequently passed through a heating zone in which the particles are softened or melted, and then through a zone in which the web is compressed in order to increase the contact of the molten or softened bonding material with the fibers, after which the resultant material is cooled in order to solidify the bonding material and thereby to bond the fibers at points throughout the fiber matrix.

The technology for producing single-phase powder bonded nonwovens is known (see, for example, Meyer et al, "Production of Laminates and Nonwovens by Powder Bonding", a paper presented at the INSIGHT '85 Advanced Forming/Bonding Conference, 27-29 October, 1985, Toronto, Canada). By way of illustration, the production of a powder bonded nonwoven fabric suitable for use in practicing this invention is next described with reference to the production line shown schematically in FIG. 1.

Figure 1:
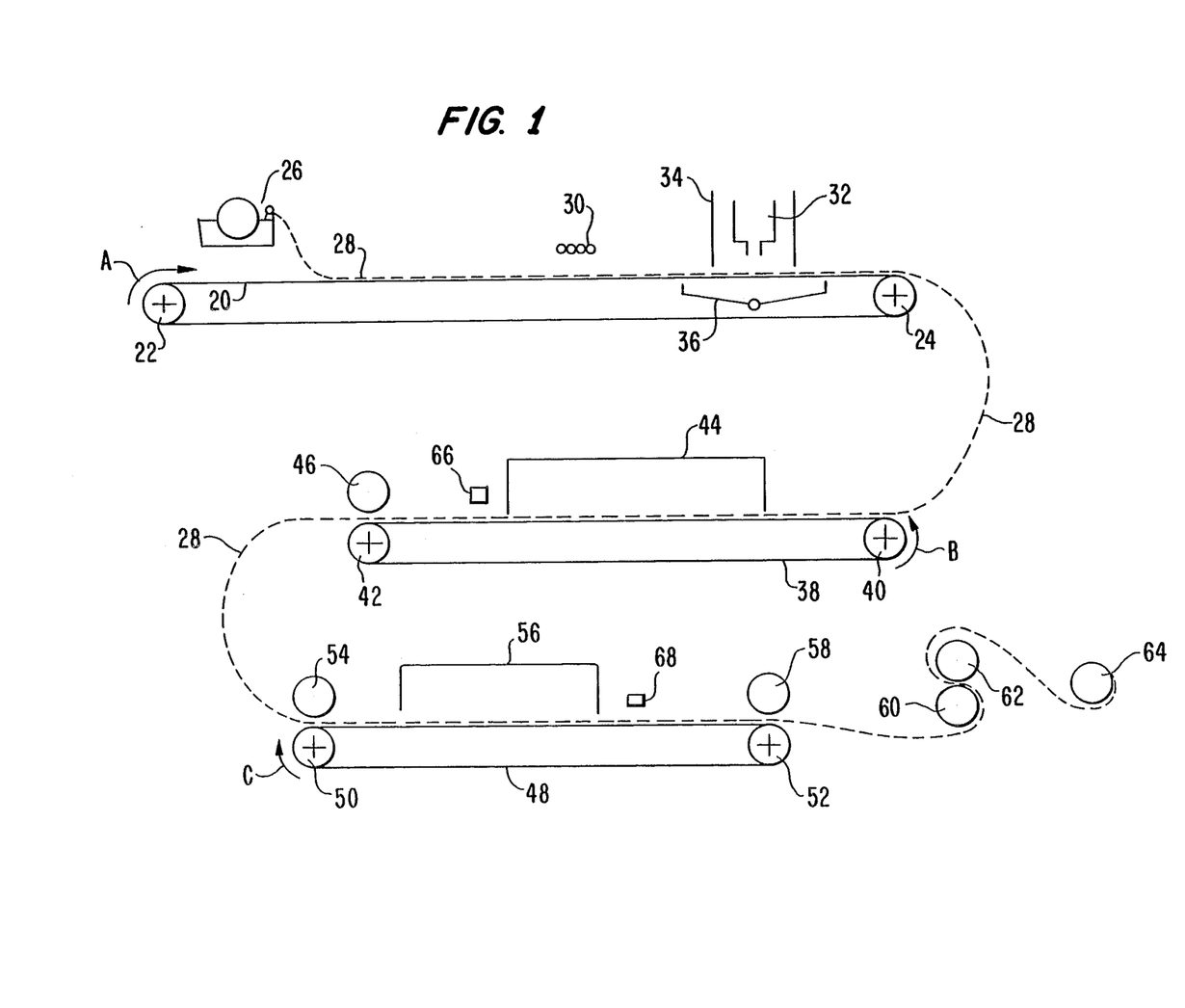
FIG. 1 is a schematic illustration of the production of a powder bonded nonwoven fabric suitable for use in practicing this invention.

This production line comprises an open-mesh conveyer belt 20 which is driven around the rollers 22, 24 in the direction indicated by the arrow A. One or more textile cards, represented by the single device 26, are provided in order to deposit a layer or web 28 of fibers on the upper surface of the conveyer belt 20. Any fiber typically employed in making nonwoven fabrics can be employed, such as polyethylene, polypropylene, rayon, acrylics, e.g., Orlon polyacrylonitrile fibers, nylons, e.g., nylon 4, 6, 6/6 or 6/12 fibers, polyester, e.g., Fortrel, Dacron or Kodel polyethylene terephthalate fibers, carbon/graphite fibers, e.g., carbonized nylon or carbonized acrylic fibers, Thunderon or Fibrix fibers, and the like, as well as blends of such fibers, e.g., rayon/polyprophylene blends. Electrically conductive fibers, and fibers of varying cross-sections, e.g., round, trilobal, pentalobal, Y-, H or I- cross-section fibers, or the like, can be used. Polyester staple fibers whose denier ranges from about 1.0 to about 6.0, of from about $\frac{3}{4}$ inch to about $2\frac{1}{2}$ inches in average staple length, are particulary preferred.

Antistatic fibers in which antistatic properties have been built into the fiber itself or into the materials, e.g., synthetic polymers, from which these fibers are prepared, as well as fibers to which antistatic finishes, including conventionally-applied anionic, cationic, nonionic or amphoteric antistatic finishes, have been applied to the fiber prior to its being deposited on the conveyer belt 20 or subsequent to its deposition but prior to the application of the powder bonding material, by any convenient means such as overspraying, saturate printing, foaming or coating, may be used to prepare the powder bonded nonwoven fabrics employed in practicing the present invention.

The fiber layer or web 28 is passed through a web-spreading section 30 and then to a zone in which the powdered bonding material is applied to the web. This zone is represented by the powder-depositing device 32 (although in practice a plurality of such devices may be used). Suitable powder-depositing devices are powder applicators of known type in which a wired roller takes powder into the space between the wires and, upon rotation, drops the powder out of that space onto the fibrous web passing beneath it. A screw 34 may be provided in order to raise or lower the roller of the powder-depositing device 32. A receptacle 36 is also provided to catch any excess powder that falls through the open-mesh conveyer belt 20, the powder so collected being available for recycling.

It will be appreciated, of course, that as an alternative to mechanical powder-depositing devices other applicators such as a fluidizing air spray or an electrostatic spray-gun can be employed, as can devices that apply the powder in a liquid carrier or in the form of a foam.

The bonding powder should have a lower melting point than the fibers in the web. In general, the bonding powder will be a thermoplastic material and it should be capable of forming a good adhesive bond with the fibers being used. In the case of polyester fibers, it is particularly preferred to use a polyester bonding powder, for example the polyester powders available from Eastman Chemical Products Inc. as hot-melt adhesives under the trademark "Eastobond". Typical polyester adhesives have melting points of from 100° to 130° C. and are available as coarse powders (200–420 microns or 70–40 U.S. standard mesh), medium powders (80–200 microns or 200–70 U.S. standard mesh) and fine powders 80 microns or less, or finer than 200 U.S. standard mesh), the medium powders being preferred when using mechanical applicators. The amount of powder deposited in the web will usually be from about 5 to about 50% of the total fabric weight, preferably from about 10 to about 20%.

The fiber layer or web 28, now with bonding powder distributed through it, is transferred from the conveyor belt 20 to a further conveyor belt 38, for example one made of Teflon polytetrafluoroethylene-coated fiberglass, which belt 38 is driven round rollers 40, 42 in the direction indicated by the arrow B and serves to carry the fibrous web 28 through an infrared oven 44. Within the oven 44, the bonding powder fuses and bonds the fibers of the web 28 at fiber crossover points where the fibers and the bonding material come into contact. Upon leaving the oven 44, the web 28 is subjected to light pressure by means of the nip roll 46.

It has been found that the strength of the web material can be improved by reheating. Accordingly, the web 28 leaving the nip roll 46 is transferred to another conveyor belt 48 which is driven round rollers 50, 52 in the direction indicated by the arrow C. As it contacts the conveyor belt 48, the web 28 is carried beneath a lightweight roller 54. The web 28 is then carried through a second infrared oven 56 and thereafter is subjected to further compression by means of the nip roll 58. The nip rolls 46 and 58 may be heated during start-up but thereafter are generally cooled during operation. The rollers 40, 42 and 50, 52 may also be water-cooled in order to prevent an excessive build-up of temperature due to the transfer of heat from the infrared ovens 44 and 56. The resultant web 28 is then further cooled by passing it around the water-cooled cans 60, 62, or by air-cooling, following which the web is wound into a roll on a winder 64 and subsequently slit to usable widths by means not shown.

Suitable oven temperatures will depend upon the bonding powder that is used and will be ascertainable from simple trials or from the literature provided by the supplier of the bonding powder. Typically, however, the temperatures in the infrared ovens 44 and 56 will be within the range of from about 80° C. to about 200° C. The temperature of the web emerging from the ovens 44 and 56 may be monitored, for example by means of infrared devices 66 and 68, respectively. It will be appreciated, of course, that the infrared ovens 44 and 56 can be replaced by other heating devices, e.g., calenders, hot-air ovens, steam presses and heated contact cans with non-stick surfaces. The dwell time of the web in each oven will depend upon the line speed that is achievable, and other factors, but may typically be from about 20 seconds to about 2 minutes.

The pressures applied by the nip rolls 46 and 54 will depend upon the materials used, the desired characteristics of the web [non-abrasiveness to the diskette or disk, low levels of debris, compressibility, wiping uniformity, high surface area and low torque values are among the more important of such characteristics] and the process line conditions; normally, pressures of up to about 20 kg per cm of roll face width are used.

When practicing this invention, a powder bonded nonwoven fabric is laminated as a liner layer, using standard laminating techniques, e.g., pin lamination using a variety of pin patterns, heat and pressure lamination, or combinations of the two, to what will be the inner surface of the material which forms the outer portion of the diskette or disk jacket or cartridge. This latter material is usually a relatively thin layer of high impact plastic material, e.g., a vinyl plastic material such as polyvinyl chloride or the like, of from about 0.010 inch to about 0.050 inch in thickness. The Petkiewicz article, at page 122, discusses the typical method used today to construct lined diskette or disk jackets:

> "The method for manufacturing floppy disks has changed in recent years from that of piecemeal fabrication to one of continuous manufacture. Even more recent changes have been from continuous 'inline' manufacture to what is now known as 'transverse' manufacture. This simply means that attempts are being made to increase machine throughput by changing production orientation during the lamination of liner to the jacket material.

Figure 3:
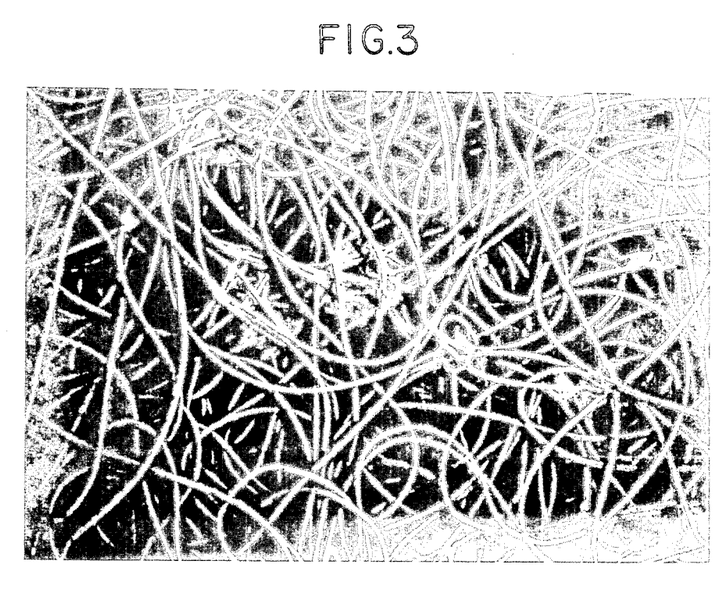
FIGS. 3, 4 and 5 are photomicrographs (48.1×, 102× and 300× magnification, respectively) of powder bonded polyethylene terephthalate nonwoven fabrics.

> FIG. 3 represents a schematic for continuous lamination of the nonwoven liner to the jacket material. The production process can be subdivided into two major operations:

Manufacture of the magnetic media Construction of the jackets"

* * *

"Construction of the floppy disk jacket involves laminating a nonwoven lining to a PVC jacket. In the continuous laminating equipment most widely used today, the PVC sheet is passed through a "decurling chamber" in order to eliminate any internal stress in the PVC. The nonwoven liner is fed into the rotary die where it is cut to the required length.

The die cut pieces are then positioned on the PVC sheet via a transfer roll. This process requires exact placement of the liner onto the PVC sheet. This is accomplished by removing any static from the nonwoven liner using static eliminators, while at the same time statically charging the PVC with a static generator. This holds the liner exactly in position. The liner is then pin laminated to the PVC, where the laminate is cut and punched into 'flats.' This assembly is then folded and edge sealed on subsequent equipment.

At this point, the [magnetic media or floppy disk] can be placed into the folded jacket."

* * *

"The last step in the manufacturing process is the folding and sealing of the jackets with an end folder."

And see FIG. 3 on page 122 of the Petkiewicz article.

Figure 2:
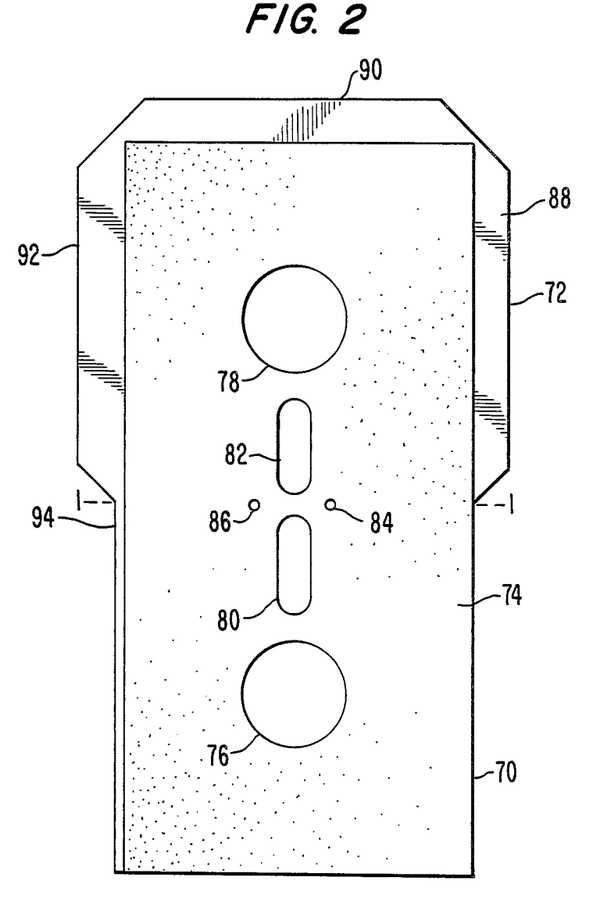
FIG. 2 is a picture of a diskette jacket blank, before folding and edge sealing, nonwoven fabric liner side up.

A typical laminated diskette jacket blank, prepared in accordance with this invention, before folding and edge sealing, is illustrated nonwoven liner side up in FIG. 2. The blank 70 has an outer jacket portion 72 to which there has been laminated a powder bonded nonwoven fabric liner 74. The large circular holes 76, 78 will, once the blank 70 is folded over upon itself, liner side in, along the line 1—1, form the diskette jacket's central aperture for the drive hub of the computer's disk drive. Using a powder bonded nonwoven fabric as the fabric liner portion 74 of the diskette jacket blank 70 also results in better lamination or adhesion of the liner 70 to the outer jacket portion 72 at the fold over point 1—1 than can be achieved using conventionally-employed nonwoven fabrics. The oblong holes 80, 82 will, at that point, form the diskette jacket's transducer aperture (or diskette reading slot), and the small circular holes 84, 86 will form the diskette jacket's sector (index) aperture. The outer jacket portion 72 of the blank 70 has four edges, 88, 90, 92 and 94, which protrude beyond the edge of the powder bonded nonwoven fabric liner 74. These protruding edges will, once the blank 70 is folded over upon itself along the line 1—1, liner side in, and the floppy disk (not shown) is inserted into the diskette jacket, be folded over and sealed to edge seal the diskette jacket.

Trials were conducted in which:

1. thermally bonded antistatic nonwoven 100% polyester fabric, 5.1" wide and 0.065" thick, containing polyethylene terephthalate staple fibers of 1.5 average denier per filament and 1 9/16 inches average staple length, thermally point bonded and subjected to an antistatic post treatment (Style 149-007; available from the Kendall Company, Boston, Mass.), 2. a powder bonded nonwoven 100% polyester fabric, 5.1" wide and 0.065" thick, containing special antistatic polyethylene terephthalate staple fibers of 1.5 average denier per filament and 1 9/16 inches average staple length, prepared as described hereinabove using Eastobond 252 medium polyester powder to bond the fibers, were each laminated to a 6" wide and 0.014" thick polyvinyl chloride sheet (Hoechst) by the Bernal process as described at page 122 of the Petkiewicz article. The same pin pattern was used from run to run.

The thermally bonded nonwoven antistatic polyester fabric liner (1) ran at a processing speed of 108 parts per minute, while the powder bonded nonwoven antistatic polyester fabric liner (2) ran at a processing speed of 162+ parts per minute [an approximately 50% increase in production throught-put over that achieved using liner (1)].

Figure 4:
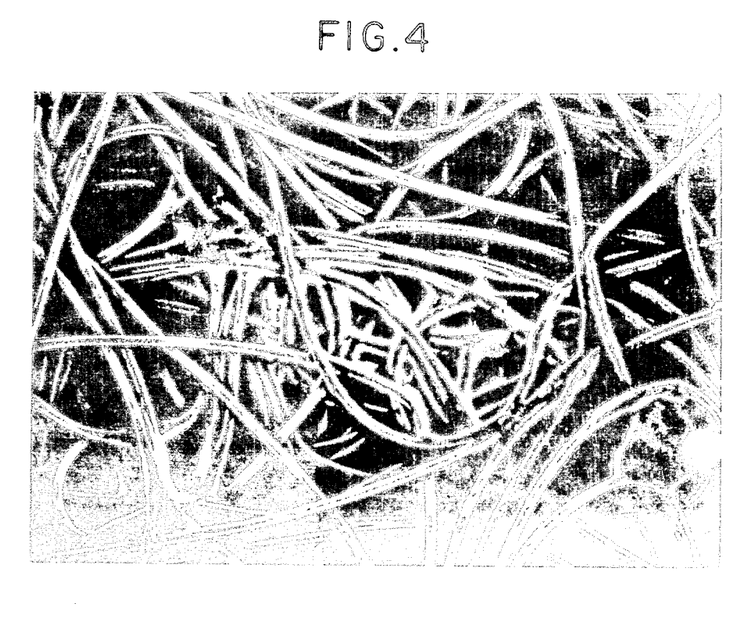
Figure 5:
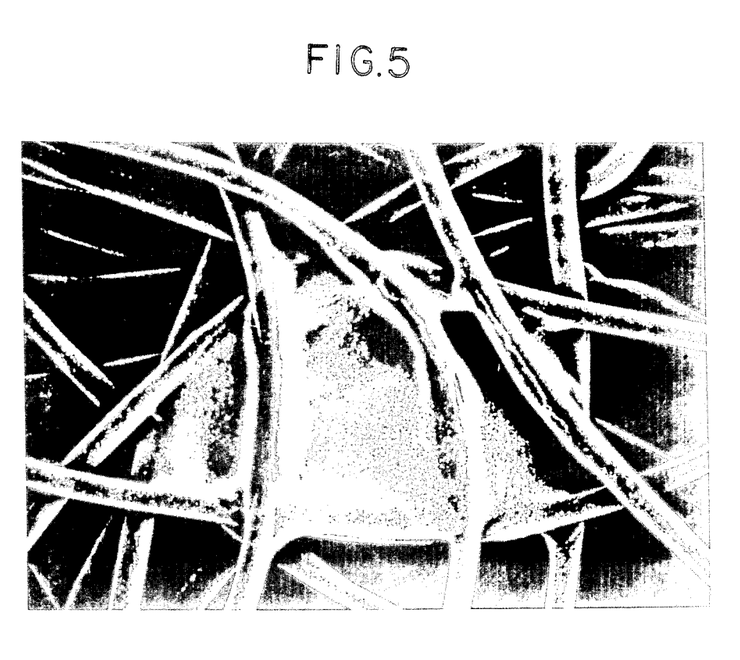
Figure 6:
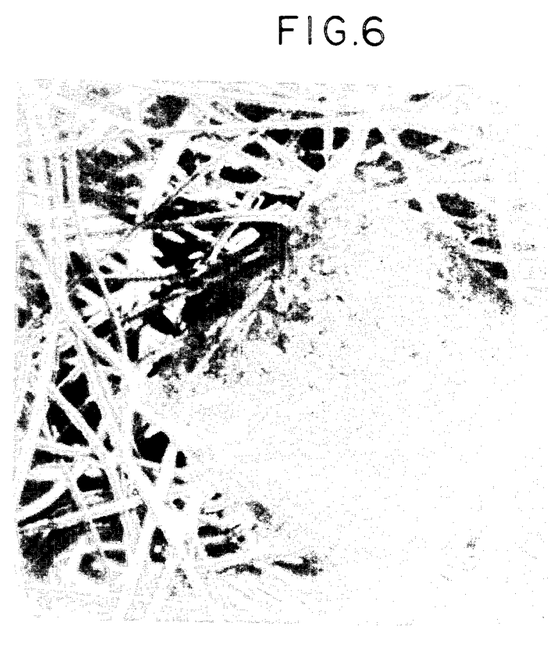
FIGS. 6 and 7 are photomicrographs (70× and 200× magnification, respectively) of thermally bonded polypropylene and thermally bonded polyethylene terephthalate nonwoven fabrics, respectively.
Figure 7:
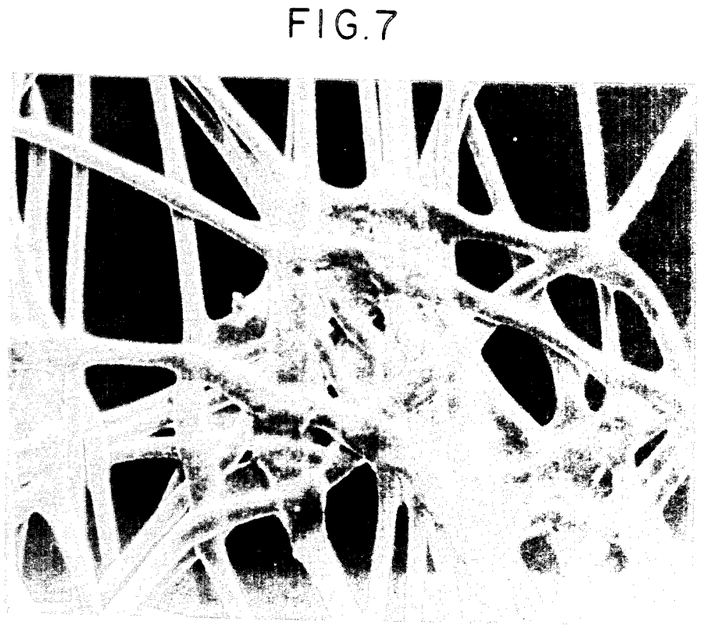

As indicated above, this invention also provides improvements with regard to lamination around cutouts in the thus-prepared diskette or disk jackets (the large circular holes 76, 78, the oblong apertures 80, 82 and the small circular holes 84, 86 in the blank 70 shown in FIG. 2), and in cleanliness, as evidenced by lessened protrusion of fibers into the cutout areas. Protrusion of fibers into the diskette or disk reading slot can cause read-/write errors. Diskette or disk jackets lined with powder bonded nonwoven fabrics, prepared in accordance with this invention have, in contrast to those using nonwoven liners bonded in some other fashion, e.g., thermally bonded nonwovens, a smaller and more widely distributed bond area and a higher frequency of bond sites. This can be seen by contrasting the bonding structures shown in FIGS. 3, 4 and 5, which are photomicrographs (48.1×, 102× and 300× magnification, respectively) of powder bonded polyethylene terephthalate nonwoven fabrics, with the bonding structures shown in FIGS. 6 and 7, which are photomicrographs (70× and 200× magnification, respectively) of thermally bonded polypropylene (FIG. 6) and thermally bonded polyethylene terephthalate (FIG. 7) nonwoven fabrics (FIGS. 6 and 7 are reproduced from *Nonwovens World*, May–June, 1986, p. 51).

This smaller and more widely distributed bond area and higher frequency of bond sites significantly decreases the probability of free fibers remaining at the cutout sites after cutting. In addition, the heat generated when cutting apertures diskette or disk jacket blanks made using powder bonded nonwoven fabrics as the liner material more readily fuses the edges of the fabric around the cutout areas, further improving the tie-down of the cut fibers.

The above discussion of this invention is directed primarily to preferred embodiments and practices thereof. It will be readily apparent to those skilled in the art that further changes and modifications in the actual implementation of the concepts described herein can easily be made without departing from the spirit and scope of the invention as defined by the following claims.

We claim:

1. A jacket for retaining a flexible rotary magnetic record diskette or disk comprising a relatively thin outer layer of high impact plastic material and an inner liner of powder bonded nonwoven fabric laminated to said outer layer.

2. A diskette or disk jacket as recited in claim 1 wherein said outer layer comprises a vinyl plastic material.

3. A diskette or disk jacket as recited in claim 2 wherein said vinyl plastic material is polyvinyl chloride.

4. A diskette or disk jacket as recited in claim 1 wherein said powder bonded nonwoven fabric contains polyester fibers.

5. A diskette or disk jacket as recited in claim 1 wherein said powder bonded nonwoven fabric contains antistatic polyester fibers.

6. A diskette or disk jacket as recited in claim 1 wherein said powder bonded nonwoven fabric contains polyester fibers and an antistatic finish on all or a substantial part of the fiber content.

7. A diskette jacket or disk as recited in claim 1 wherein said powder bonded nonwoven fabric contains polyester fibers and an antistatic finish on all or a substantial part of said fabric.

8. A jacket for retaining a flexible rotary magnetic record diskette or disk comprising a relatively thin outer layer of polyvinyl chloride and an inner layer of powder bonded nonwoven polyester fabric laminated to said outer layer.

9. A jacket for retaining a flexible rotary magnetic record diskette or disk comprising a relatively thin outer layer of polyvinyl chloride and an inner layer of powder bonded nonwoven antistatic polyester fabric laminated to said outer layer.

10. A method of constructing a jacket for retaining a flexible rotary magnetic record diskette or disk which comprises the steps of laminating a powder bonded nonwoven fabric to a relatively thin layer of high impact plastic material, cutting the thus-obtained laminate to form a blank, punching the appropriate apertures into said blank and folding and edge sealing said blank.

11. A method as recited in claim 10 wherein said powder bonded nonwoven fabric contains polyester fibers.

12. A method as recited in claim 10 wherein said powder bonded nonwoven fabric contains antistatic polyester fibers.

13. A method as recited in claim 10 wherein said powder bonded nonwoven fabric contains polyester fibers and an antistatic finish on all or a substantial part of the fabric's fiber content.

14. A method as recited in claim 10 wherein said powder bonded nonwoven fabric contains polyester fibers and an antistatic finish on all or a substantial part of said fabric.

15. A method as recited in claim 10 wherein said plastic material is a vinyl plastic material.

16. A method as recited in claim 10 wherein said plastic material is polyvinyl chloride.

17. In a method of constructing a jacket for retaining a flexible rotary magnetic record diskette or disk, the improvement which comprises laminating a powder bonded nonwoven fabric to a relatively thin layer of high impact plastic material.

18. A method as recited in claim 17 wherein said powder bonded nonwoven fabric contains polyester fibers.

19. A method as recited in claim 17 wherein said powder bonded nonwoven fabric contains antistatic polyester fibers.

20. A method as recited in claim 17 wherein said powder bonded nonwoven fabric contains polyester fibers and an antistatic finish on all or a substantial part of the fabric's fiber content.

21. A method as recited in claim 17 wherein said powder bonded nonwoven fabric contains polyester fibers and an antistatic finish on all or a substantial part of said fabric.

22. A method as recited in claim 17 wherein said plastic material is a vinyl plastic material.

23. A method as recited in claim 17 wherein said plastic material is polyvinyl chloride.

24. In a jacket for retaining a flexible rotary magnetic record diskette or disk, said jacket comprising an outer layer and an inner layer bonded to said outer layer, the improvement which comprises said inner layer being a powder bonded nonwoven fabric.

25. A diskette or disk jacket as recited in claim 24 wherein said powder bonded nonwoven fabric contains polyester fibers.

26. A diskette or disk jacket as recited in claim 24 wherein said powder bonded nonwoven fabric contains antistatic polyester fibers.

27. A diskette or disk jacket as recited in claim 24 wherein said powder bonded nonwoven fabric contains polyester fibers and an antistatic finish on all or a substantial part of the fiber content.

28. A diskette or disk jacket as recited in claim 24 wherein said powder bonded nonwoven fabric contains polyester fibers and an antistatic finish on all or a substantial part of said fabric.

* * * * *